United States Patent Office 2,796,398
Patented June 18, 1957

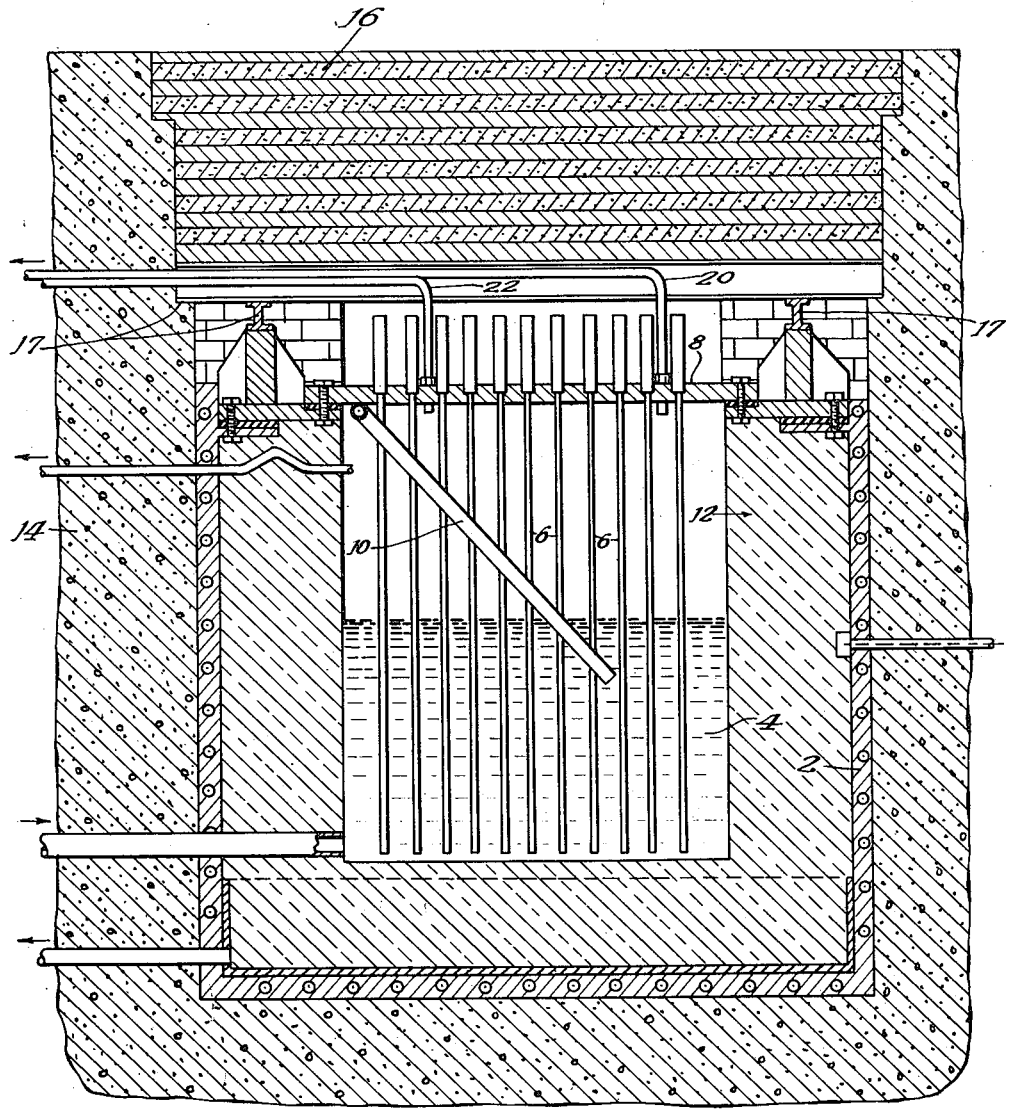

2,796,398
MEANS FOR SUSTAINING A NUCLEAR FISSION CHAIN REACTION

Edward C. Creutz, Pittsburgh, Pa., Leo A. Ohlinger, Los Angeles, Calif., Eugene P. Wigner, Princeton, N. J., and Gale J. Young, Hawthorne, N. Y., assignors to the United States of America as represented by the United States Atomic Energy Commission Application October 8, 1946, Serial No. 701,904

1 Claim. (Cl. 204—193)

This invention relates to the general subject of nuclear fission and more particularly to a novel method and means for sustaining a nuclear fission chain reaction in a system wherein the reactive composition is at least partially liquid and is preferably under pressure.

In a neutronic reactor, a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general such reactors comprise bodies of composition containing such fissionable material, for example, natural uranium disposed in a neutron slowing material which slows the neutrons to thermal energies at which they are most efficient to produce fission. Such a slowing material is termed a neutron moderator and is preferably formed of a substance having the characteristics of relatively small neutron capture cross section and relatively great scattering cross section. Heat evolved during the reaction is generally removed by passage of a coolant through the reactor in heat exchange relationship therewith by converting the heat to mechanical energy through the use of a heat engine such as a steam turbine. Specific details of the theory and essential characteristics of such reactors are set forth in copending application of Enrico Fermi and Leo Szilard, Serial Number 568,904, filed December 19, 1944, now Patent No. 2,708,656.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

1. by absorption or capture in the uranium content of the bodies without producing fission,
2. by absorption or capture in the moderator material itself,
3. by absorption or capture by the impurities present in both the uranium bodies and the moderator,
4. by leakage out of the system through the periphery thereof, which can be reduced by an efficient reflector surrounding the reactive composition.

As stated, the present invention relates to a neutronic reaction system wherein the reactive composition is at least partially liquid and is preferably a structure wherein members containing fissionable material are supported within a liquid neutron moderator, such as heavy water ($D_2O$) or ordinary water. The invention may also be applied to reactors wherein the fissionable material is dissolved in a liquid neutron moderator as, for example, solutions of $UO_2F_2$ and $UO_2SO_4$ in heavy water; or wherein the fissionable material is suspended within the liquid moderator to form a colloid or slurry.

The general object of the invention is to provide a novel neutron reflector of neutron moderator or scattering material around a liquid or semi-liquid reactive composition, said reflector minimizing escape of neutrons from the chain reaction, as is more fully discussed in the above-mentioned copending application. By thus reducing neutron losses, a relatively compact active portion of the reactor may be designed which is operative to develop a nuclear fission chain reaction even though said portion is smaller than the critical size at which a reaction would otherwise be sustained. It will be understood that by such a construction considerable quantities of valuable material may be conserved.

Another object of the invention is to arrange a solid neutron reflector within a reaction tank or chamber containing the reactive composition which thus contacts the reflector, thereby eliminating the necessity for a neutron absorbent liner between the reflector and the reactive composition which greatly increases the neutron reflecting efficiency of the reflector.

Still another object of the invention is to provide an unlined container of solid neutron reflecting or moderating material, said container enclosing a reactive composition such as above described.

Still another object of the invention is to design a structure such as above described wherein an external pressure vessel or container surrounds the reflector structure for resisting operating pressures to which the reactive composition is usually subjected for the purposes hereinafter set forth in detail.

The foregoing and other objects and advantages of the invention will become apparent from the following description and the accompanying drawing, which is a diagrammatic vertical sectional view through a neutronic reactor constructed in accordance with the invention.

Describing the invention in detail, it is illustrated as applied to a reactive composition disposed within a reactor tank or chamber 2 preferably formed of a material having the characteristics of relatively great strength such as, for example, stainless steel. The reactive composition comprises a body of neutron moderator liquid 4 and a plurality of aluminum sheathed uranium rods 6 supported from a lead cover 8 on the reactor tank 2. A control rod 10 of neutron absorbent material, such as cadmium, is supported within the tank 2, and is adapted to be raised or lowered therein by actuating means (not shown) for the purpose of controlling the neutron density within the system, as is more fully discussed in the above-mentioned copending application.

The reactive composition comprising the moderator 4 and the sheathed uranium rods 6 is disposed within a neutron reflector 12 in the form of an unlined container with a wall thickness of 4 to 6 inches, for example, generally cup-shaped in form and disposed within the tank 2 in abutment with the inner surface thereof. The reflector 12 is preferably formed of blocks of solid moderator material such as beryllium or beryllium oxide, but if desired the reflector may be in the form of a unitary container, such as, for example, a casting or welded structure of substantially pure beryllium metal. It will be understood that the above-described structure is novel in that no liner or tank wall is needed between reflector 12 and the liquid moderator which directly contacts the reflector, thereby dispensing with the neutron absorption of the eliminated lining material, which is customarily a material such as aluminum, capable of absorbing a small but substantial amount of neutrons. A reflecting layer could be provided by extending the moderator, such as $D_2O$, a distance beyond the rods on all sides and the bottoms. However, by providing the reflector 12 within the reactor tank 2, a relatively large quantity of heavy water 4 is displaced, thereby making possible the chain reaction with a considerably smaller amount of heavy water than would be required if the solid reflecting material 12 were eliminated and the space occupied thereby were filled with heavy water.

Surrounding the tank 2 is a pressure chamber or vault 14, preferably formed of a good radiation shielding material, such as concrete, adapted to absorb substantially all emanations from the reactive composition. The top of the vault 14 is closed by a biological shield or cover 16 adapted to absorb radiation from the reactor, such shield being preferably composed of alternate layers of iron and "masonite" and being afforded support by crossed I-beams 17.

The moderator liquid 4 is circulated through the tank 2 by a system (not shown), such as is more fully described in said copending application; and helium under pressure is circulated through the top of tank 2 above the level of the moderator 4 by means of helium inlet and outlet pipes 20 and 22, respectively, said helium functioning to sweep decomposition gases ($D_2$ and $O_2$) and gaseous fission products from the tank 2. Also, the charge of pressure helium on the heavy water within the tank 2 is effective to raise the boiling point of the heavy water, thereby permitting operation of the reactor at relatively high temperatures without boiling the liquid neutron moderator.

Even when ordinary water is used as the moderator, the internal reflector has numerous advantages. Light water ($H_2O$) while being a good neutron scattering substance due to its hydrogen content, also is a good neutron absorber. Beryllium or its oxide, makes a better reflector than the light water and thus when used as an internal reflector increases the efficiency of the reactor.

Furthermore, the internal reflector may be used with slurries or solutions, provided care is taken that no cracks or crevices extend into the reflecting layer wherein uranium particles may lodge to become by continuous neutron bombardment and fission excessively radioactive, and thereby to rise in temperature. A beryllium metal layer with a smooth internal surface is an excellent reflector for a neutronic composition comprising a liquid slurry or solution of fissionable isotopes.

While many liquid reactive compositions may be operated under substantial pressures, requiring the use of a stainless steel tank back of the reflecting layer, it is to be noted that for lower pressures no backing tank is needed and that the reflecting layer 12, when made to be liquid tight may serve as the sole container for the reactive composition.

From the foregoing it will be understood that the invention comprehends a novel method and means for reducing the size at which a neutronic reactor, at least partially liquid in form, is capable of sustaining a nuclear fission chain reaction, by providing an unlined solid reflector around the reacting composition in direct contact therewith.

While the theory of nuclear fission set forth herein is based on the best presently known experimental data, facts later discovered may modify the theory disclosed. It will be understood that various embodiments of the invention will be apparent to those skilled in the art without departing from the scope of the invention which is limited solely by the appended claim.

What is claimed is:

In a system of the class described, a steel container, a liner of a material selected from the group consisting of beryllium oxide and beryllium metal within said container, heavy water moderator within and in contact with said liner and uranium fuel rods disposed in said heavy water moderator, said liner, heavy water moderator and uranium fuel rods cooperating to sustain a nuclear chain reaction.

References Cited in the file of this patent

UNITED STATES PATENTS

| 2,708,656 | Fermi et al. | May 17, 1955 |

FOREIGN PATENTS

| 114,150 | Australia | May 2, 1940 |
| 114,151 | Australia | May 3, 1940 |
| 233,011 | Switzerland | Oct. 2, 1944 |
| 861,390 | France | Oct. 28, 1940 |

OTHER REFERENCES

Nucleonics, June 1953, pages 23, 24.

A General Account of the Development of Methods of Using Atomic Energy for Military Purposes, 1940–1945, by H. D. Smyth, August 1945, pages 42, 43, 75, 106, 107 and 108, 153, 177–180.

Handbook of Chemistry and Physics, Chemical Rubber Co., 26th ed. (1942), pages 346, 347.

Kelly et al.: Phy. Rev. 73, 1135–9 (1948).